United States Patent [19]

Vandenberg

[11] 4,300,787
[45] Nov. 17, 1981

[54] LIFT AXLE SUSPENSION

[75] Inventor: Ervin K. Vandenberg, Massillon, Ohio

[73] Assignee: Turner Quick-Lift Corporation, Canton, Ohio

[21] Appl. No.: 119,250

[22] Filed: Feb. 7, 1980

[51] Int. Cl.³ .............................................. B60G 11/26
[52] U.S. Cl. .................................. 280/704; 280/43.23
[58] Field of Search ..................... 280/704, 712, 43.17, 280/43.19, 43.23

[56] References Cited

U.S. PATENT DOCUMENTS

| 3,689,102 | 9/1972 | Granning | 280/704 |
| 3,794,344 | 2/1974 | Raidel | 280/704 |
| 4,165,884 | 8/1979 | Allison et al. | 280/704 |
| 4,171,830 | 10/1979 | Metz | 280/704 |

Primary Examiner—Joseph F. Peters, Jr.
Assistant Examiner—Ross Weaver
Attorney, Agent, or Firm—Geoffrey R. Myers

[57] ABSTRACT

A lift axle suspension wherein the mechanism for lifting the axle includes a pivotal connection located below the longitudinal frame member of the vehicle and a pair of plates, one pivotally attached to the pivotal connection and the other rigidly attached in the suspension, an air bellows located between the pair of plates and a link member functionally attached between the axle and pivotally attached plate such that expansion or retraction of the bellows lifts the axle and the opposite operation allows the axle to be lowered.

18 Claims, 3 Drawing Figures

LIFT AXLE SUSPENSION

This invention relates to suspensions for wheeled vehicles. More particularly, this invention relates to lift axle suspensions and certain subcomponents thereof.

Lift axle suspension systems have been employed on heavy duty trucks, tractors and trailers since at least the late 1950's. A purpose of these suspensions is to provide an auxiliary means for carrying a portion of the weight of the vehicle along with the primary axles (and wheels). A further purpose is to be able to lift the wheels of this auxiliary axle from the road surface when not needed or desired for various reasons well known in the art. The liftable and lowerable characteristic of these axles reduces tire wear, tire scuffing, conserves energy and adds certain safety features to the operation of the vehicle.

Since their inception many types and varieties of these lift axle suspensions have been designed and employed with varying degrees of success or failure. Among the most successful are those of the longitudinally disposed air up, air down, rigid beam type produced, for example, by Neway Corporation, Muskegan, Michigan, and those of the upwardly biased leaf spring type produced by Turner Quick-Lift Corporation and generally disclosed in the basic Turner U.S. Pat. 3,185,621. Both of these types of units have the advantage of being safe, durable, effective for their intended purpose, useful in both the pusher (forward of the drive axle) and tag (rearward of the drive axle) positions and on both truck chassis and trailer alike. They also overcome the drawback of certain other designs whose mechanisms require the use of the chassis or trailer frame area above its lowermost plane. This area is not always available due to the location of other vital truck or trailer components therein, such as brake lines, drive lines, and the like.

While these two types of lift axle suspensions have operated effectively and solved an important need in the art, a few of their characteristics or capabilities leave room for improvement. For example, in the rigid beam air-up, air-down type, the length of the overall unit prohibits its use where only short frame lengths are available to accommodate the suspension. While an upwardly biased leaf spring lift axle capable of fitting into relatively short places has been successfully developed, as disclosed in U.S. Pat. No. 3,904,220 owned by Turner Quick-Lift Corporation, optimized lift height and spring life have not always been achievable, and for certain purposes the overall length of the unit was still too large.

In view of the above, it is apparent that there exists in the art a need for new subcomponents and lift axles which may be used in a wide variety of situtations and which, in certain embodiments, are adaptable to be used in short spaces and still obtain high lift capabilities, e.g., axle travel about 10 inches and ground to tire clearances of about 6 inches or more given vehicle frame-to-ground heights of about 28–30 inches using tires of the 10.00×20 size.

Generally speaking this invention fulfills these and other needs in the art, by providing in a lift axle suspension for a wheeled vehicle having a longitudinally extending frame member on either side of the vehicle, the suspension comprising with respect to each of said frame members, means for connecting an axle to the said frame members of the vehicle, means for raising the axle so as to lift the wheels of the vehicle above a road surface and means for lowering the wheels of the vehicle onto the road surface, the improvement comprising as said means for raising the axle so as to lift the wheels of the vehicle above the road surface, a pivotal connection, an expandable and retractable air bellows located between a pair of plate means, one of said plate means being rigidly attached in said suspension and the other of said plate means being pivotally attached to said pivotal connection, a link member functionally connected between said pivotally connected plate means and an axle when located in said suspension such that upon expansion or retraction of said air bellows said pivotally connected plate means moves with respect to said rigidly attached plate means thereby causing the link member to raise the axle an amount sufficient to disengage the wheels from the road surface and upon causing the opposite movement of said air bellows said pivotally connected plate means moves with respect to said rigidly attached plate means thereby allowing the axle to be lowered an amount sufficiently to bring the wheels into engagement with the road surface.

In certain embodiments contemplated by this invention the plate means are so located that when the air bellows are fully expanded no portion of the plate means or bellows extend above the lowermost plane of the frame members of the vehicle.

In certain other embodiments, the suspension is of the air-up, air-down rigid beam type. In such embodiments, the axle may be located above or beneath the beam, and the air-down feature may be achieved by an air bellows located at the end of the beam. In such embodiments where the axle is located above the beam, optimum lift heights are efficiently achieved (e.g., at times up to about 10 inches of axle travel or more and tire clearance of about 6 inches or more given a frame height of 28–30 inches from the ground, and a 10.00×20 tire size).

In certain further embodiments a hanger bracket is employed to attach a portion of the suspension to the longitudinal frame members of the vehicle. In such embodiments this hanger bracket may also serve as a convenient connection and location for the pivotal connection and rigidly attached plate means. In such embodiments, it is also useful to locate the pivotal connection so that it is on the inboard side of the hanger and is substantially parallel to its respective vehicle longitudinally extending frame member.

While this invention will hereinafter be described with respect to a rigid beam air-up, air-down type environment, it is understood that the unique lifting mechanisms of this invention are employable in a wide variety of lift axle types and are not necessarily limited to this particular suspension.

With reference now to certain illustrated embodiments of this invention wherein:

IN THE DRAWINGS

Figure 1:
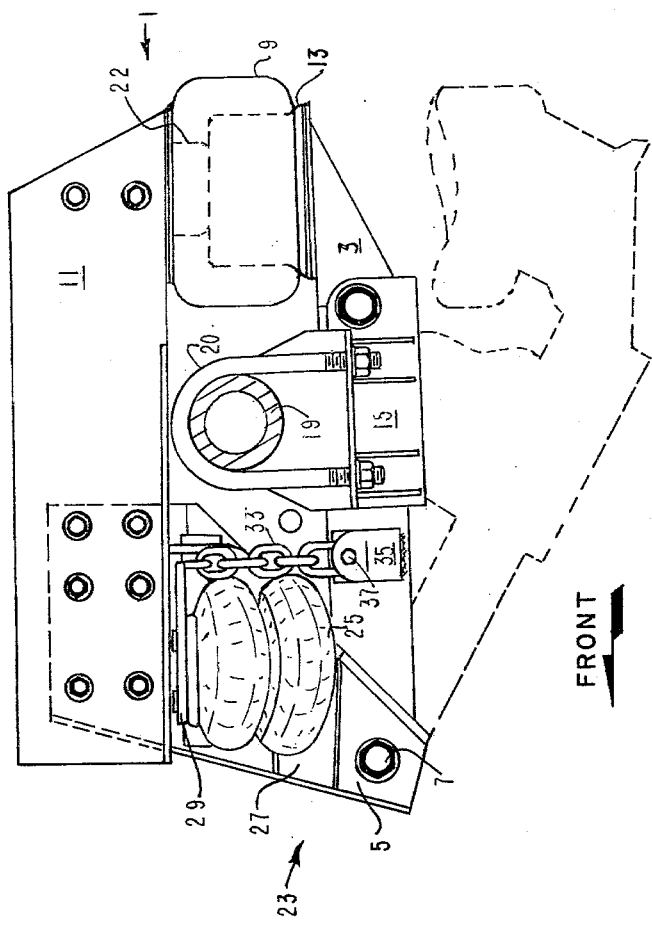
FIG. 1 is a side plan partially sectionalized, inboard view of an embodiment of this invention.
Figure 2:
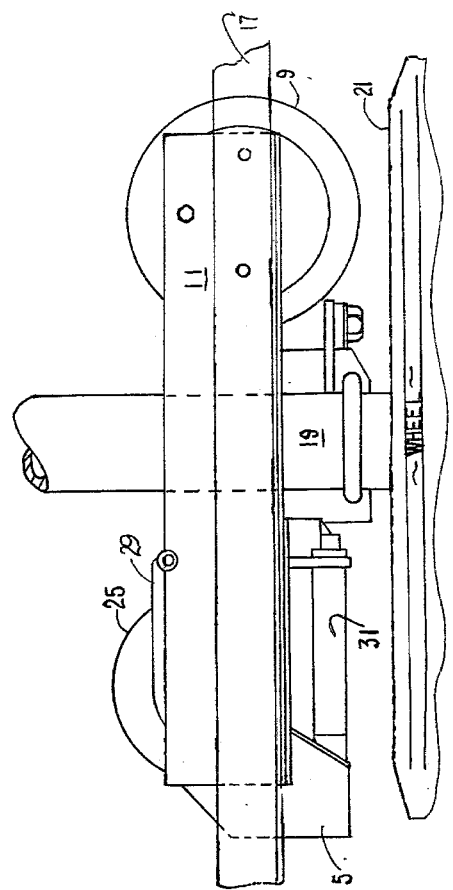
FIG. 2 is a top plan view of the embodiment of FIG. 1 as attached to the vehicle.
Figure 3:
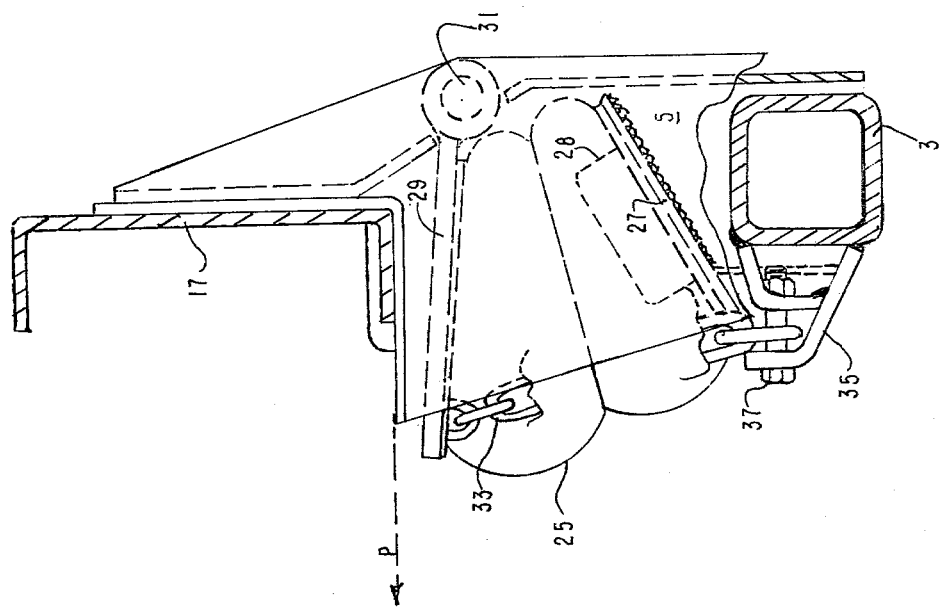
FIG. 3 is a front plan, partially sectionalized view of the embodiment of FIG. 2.

As illustrated in FIGS. 1–3, there is provided a lift axle suspension system 1 of the rigid beam air-up, air-down trailing arm type. This suspension includes a rigid beam 3 connected at its forwardmost end to hanger bracket 5 by pivotal pin connection 7. At the end of beam 3 opposite pivotal pin connection 7, there is located an extensible and retractable air bellows 9 (of known construction) attached at its upper end to unitizing beam member 11 and at its lower end via plate pedestals 13 to beam 3. Intermediate the ends of beam 3, there is located an axle-to-beam connecting member 15 which may be of any known construction. However, for purposes of this invention and in the embodiment illustrated, the unique axle-to-beam connecting member employed is that disclosed in my copending application entitled AXLE SUSPENSION SYSTEM executed on Jan. 24, 1980, and bearing Ser. No. 116,339, the disclosure of which is incorporated herein by reference.

Beam 11 serves to unitize the structure so that it may be built in complete assembly at the manufacturing site and easily installed on a longitudinal vehicle frame member 17 as best illustrated in FIGS. 2 and 3. In this respect, it is understood that most vehicles have two longitudinally extending frame members in side-by-side relation on either side of the vehicle. It is also understood that the illustrations are views of but one-half of the suspension 1, the other half being duplicated with respect to the other longitudinal frame member of the vehicle, the two halves being joined by axle 19 which at its ends bears conventional wheels (and tires) 21.

Located on the inboard side of hanger bracket 5 is an embodiment of the unique lifting mechanism of this invention. In this embodiment lift mechanism 23 comprises an expandable and retractable air bellows 25 located between a lower rigid plate member 27 and an upper pivotal plate member 29. As best illustrated in FIG. 3, lower rigid plate member 27 is connected, as by welds, to a plate member within hanger plate 5 and slants downwardly and inwardly with respect to the vehicle. Upper plate member 29 on the other hand is pivotally connected to pivotal connection 31 located in such a way that upper pivotal plate member 29 also extends inboard with respect to the vehicle. In this way, extensible and retractable air bellows 25 when inflated expands a greater distance on the inboard side of the vehicle than toward its outboard side.

Extending between upper pivotal plate member 29 and beam 3 is link member 33 which may conveniently be a chain link of any strong steel construction. Link chain 33 is connected by its lowermost loop via bracket 35 and bolt 37 to an inboard side of beam 3 and is connected by its uppermost loop to the inboard end of plate 29 thereby to maximize travel.

As can be seen from the dotted lines in FIG. 1, wherein the suspension is shown in its road engaging or lowermost position, the unique lifting mechanism 23 provides a simple, effective and safe mechanism, achieving the other characteristics desired as hereinabove listed, for a lift axle suspension system.

In this respect, conventional air valve and actuating means located in the cab of the vehicle (not shown for convenience) are provided to manipulate the flow of air into or out of either air bellows 9 or air bellows 25. For example, prior to the time that the vehicle (e.g., heavy duty dump truck or trailer) is loaded such that one does not desire to have wheels 21 in tire scuffing road engagement, the unit would be in its lifted position as illustrated in solid lines in FIG. 1. In this position air bellows 9 are exhausted of air, while air bellows 25 are in their expanded position, thereby raising plate 29 to the maximum height allowed, as illustrated, for example, in FIG. 3. This, in turn, raises axle 19 to a maximized height. The maximum height obtained may be achieved in several ways, for example, by providing a stop plate to contact plate 29, allowing plate 29 to pump against the frame member structure, or to have axle 19 or U-bolts 20 contact the lower surface of beam 11. In preferred embodiments, however, air bellows 9 is provided with a conventional internal bumper 22 which acts as a stop means on the lifting action just prior to the axle 19 or U-bolts 20 (as the case may be) coming in contact with beam 11. In this respect, it is to be pointed out that the counterforces between expanded bellows 25, line 33 and bumper 22 serve to firmly hold the suspension in its lifted, riding position. It is also to be pointed out in this respect that a maximized height is achieved in a wide variety of vehicles by this suspension. For example, in the heavy duty trucking industry wherein frame heights of approximately 28 inches to 30 inches are generally experienced, maximized lift heights of tire clearance to road surface of approximately 6 to 8 inches are experienced, using normal tire sizes. More specifically, axle travel of 10 inches or more may be achieved using tires of the 10.00×20 size on frames of about 28 inches-30 inches in height, thereby achieving tire to road clearances of about 6 inches or more.

Suspension 1 is simply and conveniently lowered by manipulating the manual valves in the cab of the vehicle to exhaust air from bellows 25 and emit air into bellows 9 thereby forcing beam 3 downwardly until wheels 21 engage the road surface. Under such a condition, bellows 9 acts as an air ride suspension between frame member 17 and the road surface.

In the environment as illustrated in FIG. 3, bellows 25 is provided with a bumper 28. Pivot connection 31 and plate 29 are so designed that when wheels 21 engage the road surface such that bellows 25 is in its retracted condition, plate 29 presses slightly into the upper surface of bumper 28, compressing bumper 28 and locating plate 29 substantially parallel to plate 27. In this position, plate 29, plate 27, link 33 and bumper 28 are positioned to coact as a shock absorber and as a downward travel limiting safety device for the suspension. For example, in addition to acting in a shock absorbing manner, thereby eliminating the need for a separate such device, if wheels 21 were to go over a large ditch or pothole and thereby tend to otherwise pull bellows 9 downwardly beyond its limits of travel, such is prevented by the coaction of plate 29, link 33 and bumper 28. In most contemplated embodiments, bellows 9 will be chosen so as to run out of downward forcing capabilities in accordance with known techniques, so as to aid rather than hinder this safety feature.

The system is conveniently lifted either while the vehicle is at rest, or while in motion, by manipulating once again the valves in the cab thereby exhausting the air from bellows 9 and emitting air into bellows 25 again raising the beam via link member 33. Using the limiting stop mechanism as described above, no portion of the lifting mechanism or the axle attachment itself extends above plane P (see FIG. 3) defined by the lowermost edge of the longitudinal frame members 17 of the vehicle. This is, in many instances, an important aspect of this invention since this area of the vehicle is often used for other vital components which as air lines, lift hoists, and the like, which cannot be conveniently moved to accommodate a lifting mechanism.

Once given the above disclosure, many other features, modifications and improvements will become apparent to the skilled artisan. Such other features, modifications and improvements are, therefore, considered to be a part of this invention the scope of which is to be determined by the following claims:

I claim:

1. In a lift axle suspension for a wheeled vehicle having a longitudinally extending frame member on either side of the vehicle, the suspension comprising with respect to each of said frame members, a substantially rigid, longitudinally extending beam, a hanger bracket means for attaching the beam to a longitudinal frame member, means for attaching an end of said beam to said bracket which retains said beam in a position substantially parallel to said longitudinal frame member and allows said beam to rotate about its attached end in a plane substantially parallel to said longitudinal frame member, said hanger bracket means including a substantially vertically extending plate member, an axle-to-beam connecting member spaced from said hanger bracket along said beam, a first expandable and retractable air bellows means functionally positioned between said beam and a respective frame member at a spaced distance from said hanger bracket means, and means for raising the axle so as to lift the wheels of the vehicle above a road surface and for lowering the axle, to lower the wheels of the vehicle onto the road surface, the improvement comprising as said means for raising and lowering the axle, a pivotal connection attached to said vertically extending plate member in such a manner that the longitudinal axis of said pivotal connection is positioned substantially parallel to the longitudinal direction of said frame member, a second expandable and retractable air bellows located between a pair of plate means, one of said plate means being rigidly attached in said suspension and the other of said plate means being attached to said pivotal connection in such a manner that said plate lies in a plane which is parallel to and rotates about the longitudinal axis of said pivotal connection, a link member connected at one end to said pivotally attached plate means and at the other end to said beam such that upon expansion or retraction of said second air bellows and the opposite movement of said first air bellows, said pivotally connected plate means and link member move with respect to said rigidly attached plate means thereby causing said beam to pivot at its connection with said hanger bracket and raise or lower the axle with respect to the road surface.

2. A suspension according to claim 1 wherein the pivotal connections are adjacent said second bellows at a location intermediate the ends of said bellows thereby to cause the side of said bellows nearest said pivotal connection to expand less than the opposite side of said bellows.

3. A suspension according to claim 2 wherein said plate means are so located that when said second air bellows are fully expanded no portion of said plate means or said second bellows extend above the lowermost plane of the longitudinal frame members of the vehicle.

4. A suspension according to claim 3 wherein said second air bellows are located substantially directly under their respective longitudinal frame member when the suspension is attached to said vehicle and the side of the bellows which expands the most is the inboard side of the bellows.

5. A suspension according to claim 1 wherein said pivotally connected plate means is the uppermost of said pair of plate means and said link member is connected to the uppermost of said plate means such that upon expansion of said second air bellows means and retraction of said first air bellows means said axle is lifted so as to raise the wheels above the road surface.

6. A suspension according to claim 1 wherein said first air bellows means are located substantially at the end of the beam opposite that to which the hanger bracket is pivotally connected.

7. A suspension according to claim 1 wherein said axle-to-beam connection is located intermediate the ends of the beam, and comprises an axle housing member located above the beam.

8. A suspension according to claim 1 wherein said hanger bracket is located so as to be outboard of its respective longitudinal frame member.

9. A suspension according to claim 1 which further includes an axle connected to said axle-to-beam connecting member.

10. In a wheeled vehicle having longitudinally extending frame members on either side of the vehicle and at least two axle suspension systems carrying road engaging wheels which provide a primary means of vehicle support in combination with a lift axle suspension system carrying wheels and provided with a mechanism for raising said wheels above the road surface and lowering said wheels into engagement with the road surface thereby to provide additional vehicle support, the improvement comprising as said lift axle suspension, the suspension of claim 1, wherein said suspension is attached to said longitudinally extending frame members of said vehicle.

11. The wheeled vehicle according to claim 10 wherein the lowermost plane of the longitudinal frame members of the vehicle are about 28–30 inches above the road surface and said lift axle suspension is capable of raising the wheels above the road surface at least about 10 inches.

12. The wheeled vehicle according to claim 10 wherein the pivotal connection is located below its respective longitudinal frame member.

13. The wheeled vehicle according to claim 12 wherein said pair of plate means between which said second bellows are located, said second bellows, and said link member are all located and of a size such that during operation no portion thereof extends above the lowermost plane of the longitudinal frame members of the vehicle.

14. The wheeled vehicle according to claim 13 wherein said first and second air bellows are located substantially directly under their respective frame members.

15. The wheeled vehicle according to claim 13 wherein one of said suspensions forming a primary means of support is a drive axle suspension located toward the rear of said vehicle, said vehicle having an engine toward the front of said vehicle and a substantially straight drive shaft extending from said engine to said drive axle suspension, and wherein said lift axle suspension is located on said longitudinal frame members between said engine and said drive axle and does not interfere with said drive shaft.

16. The wheeled vehicle according to claim 10 wherein said pivotally connected plate means is the uppermost of said pair of plate means and said link member is connected to the uppermost of said plate means such that upon expansion of said second air bellows means and retraction of said first air bellows means said axle is lifted so as to raise the wheels above the road surface.

17. The wheeled vehicle according to claim 16 wherein said first air bellows means are located substantially at the end of the beam opposite that to which the hanger bracket is pivotally connected and wherein said axle-to-beam connection is located intermediate the ends of the beam, and comprises an axle housing member located above the beam, said suspension further including an axle located in said axle housing member and extending transversely of the longitudinal frame members of the vehicle.

18. The wheeled vehicle according to claim 10 wherein said link member is a flexible link connected directly to the uppermost of said plate means and which extends directly downwardly in a substantially straight line to said beam.

* * * * *